US006772195B1

(12) United States Patent
Hatlelid et al.

(10) Patent No.: US 6,772,195 B1
(45) Date of Patent: Aug. 3, 2004

(54) CHAT CLUSTERS FOR A VIRTUAL WORLD APPLICATION

(75) Inventors: Kris E. Hatlelid, Coquitlam (CA); William D. Harrison, North Vancouver (CA); Ken G. Kavanagh, Port Coquitlam (CA)

(73) Assignee: Electronic Arts, Inc., Redwood City, CA (US)

( * ) Notice: Subject to any disclaimer, the term of this patent is extended or adjusted under 35 U.S.C. 154(b) by 0 days.

(21) Appl. No.: 09/430,389

(22) Filed: Oct. 29, 1999

(51) Int. Cl.[7] ............................................... G06F 15/16
(52) U.S. Cl. ........................ 709/204; 709/203; 709/219; 709/217; 709/224; 345/473; 345/419; 345/753; 345/757
(58) Field of Search .................................. 709/206, 203, 709/219; 345/473, 419, 753, 757

(56) References Cited

U.S. PATENT DOCUMENTS

| | | | | |
|---|---|---|---|---|
| 5,784,568 A | * | 7/1998 | Needham | 345/753 |
| 5,880,731 A | * | 3/1999 | Liles et al. | 345/473 |
| 6,057,856 A | * | 5/2000 | Miyashita et al. | 345/633 |
| 6,219,045 B1 | * | 4/2001 | Leahy et al. | 345/757 |
| 6,249,292 B1 | * | 6/2001 | Christian et al. | 345/473 |
| 6,393,460 B1 | * | 5/2002 | Gruen et al. | 709/204 |
| 6,396,509 B1 | * | 5/2002 | Cheng | 345/419 |

FOREIGN PATENT DOCUMENTS

| | | |
|---|---|---|
| EP | 0 950 056 | 10/1999 |
| WO | WO 98 08192 | 2/1998 |
| WO | WO 00 72560 | 11/2000 |

OTHER PUBLICATIONS

F.B. Viegas et al., "Chat Circles" Proceedings of the CHI 1999, Conference on Human Factors in Computing Systems, May 15–20, 1999, pp. 9–16.*

F.B. Viegas et al., "Chat Circles" Proceedings of the Chi 99, Conference on Human Factors in Computing Systems, 'Onine! May 15–20, 1999, pp. 9–16.

* cited by examiner

Primary Examiner—Ayaz Sheikh
Assistant Examiner—Syed A. Zia
(74) Attorney, Agent, or Firm—Townsend and Townsend and Crew LLP; Gerald T. Gray

(57) ABSTRACT

A virtual world environment is provided having chat clusters. Chat clusters are groupings of avatars of users who are engaged in a closed conversation. Accordingly, a request to initiate a chat cluster is received from a user. Next, the other participants of the chat cluster are identified, and a conversation area within the virtual environment is defined. The conversation area is a unseen demarcated area within which the avatars of the participants are positioned. The conversation area is generated responsive to the number of participants in the chat cluster, i.e., for two participants, the area is small, and for a cluster with many participants, the conversation area is large. Then, the avatars are oriented within the conversation toward each other. If the conversation area is a circular area, the avatars face the center of the circle. When displayed to the users of the virtual world, the avatars appear to be naturally displayed as groups of people having conversations with each other. Thus, new users can immediately identify which users are conversing with each other, and can tell which users are available for approach. Once initiating a chat cluster, the participants of the chat cluster broadcast their communications on a chat cluster communication channel, and the user's view of the virtual world focuses on the other participants of the chat cluster. The chat cluster communication channel conducts communications from participants only to other participants of the chat cluster and blocks communications from those not part of the chat cluster.

26 Claims, 12 Drawing Sheets

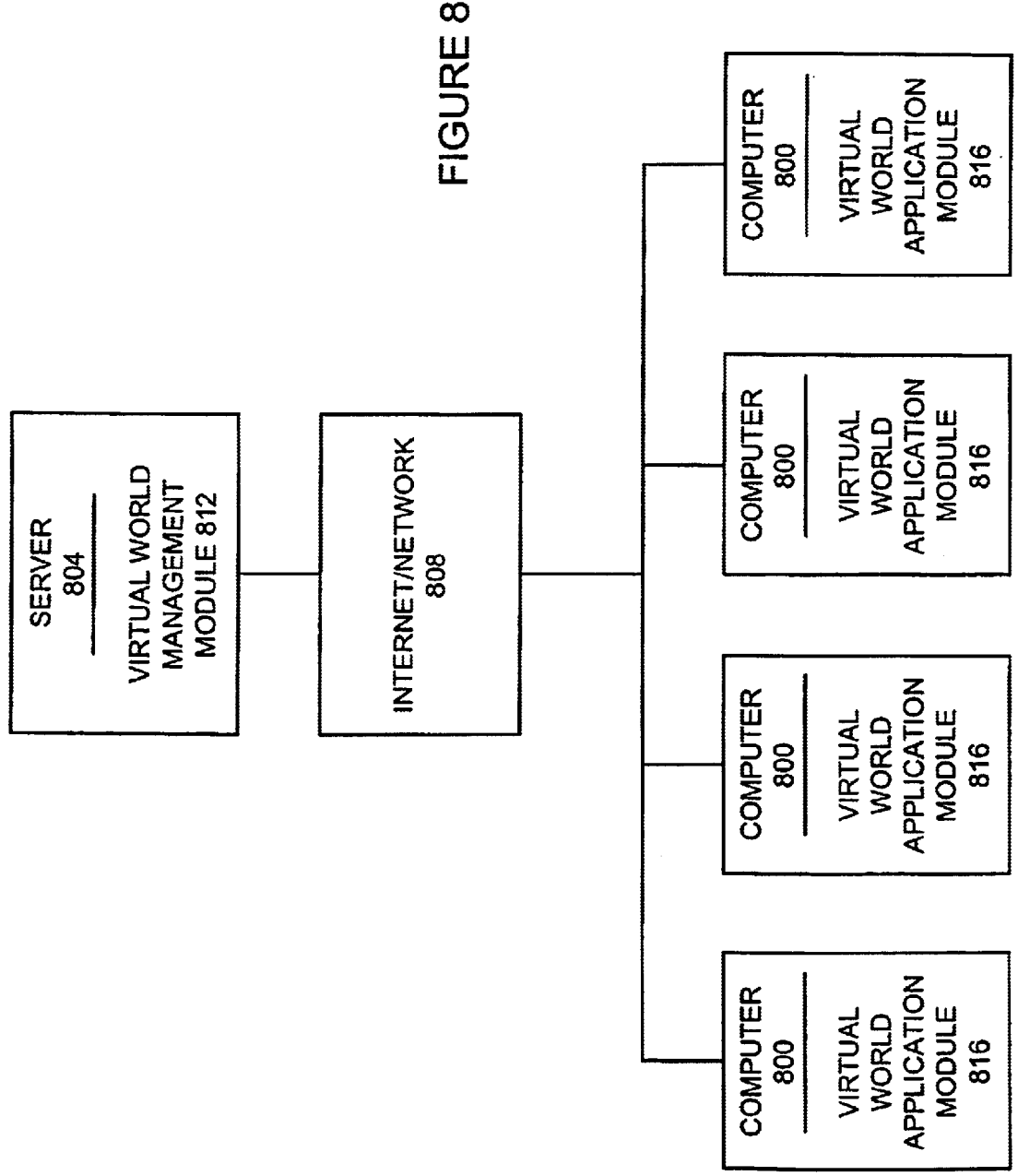

CHAT CLUSTERS FOR A VIRTUAL WORLD APPLICATION

BACKGROUND OF THE INVENTION

1. Field of Invetnion

The present invention relates generally to virtual world applications, and more specifically, to controlling the behavior of avatars within the virtual world.

2. Description of the Background Art

Virtual worlds in a computer mediated environment allow users to meet and interact with other users. Thus, the goal of many virtual worlds is to provide an environment that promotes communication between their users. However, in conventional virtual world applications, avatars of users are displayed arbitrarily and in seemingly random positions, or in positions that are controlled by the users and not responsive to communications occurring in the virtual world. This is in sharp contrast to the real world, where social behaviors associated with communication often dictate the positioning of people in a room, as people tend to congregate in physical proximity to those with which they are communicating.

For example, in a typical virtual world that provides communication with other users, chat windows or balloon text are typically displayed over the heads of the speaking characters. However, the avatars are in fixed positions on the screen as the dialogue is displayed over their heads, or, if they move, their movements are responsive to user commands. This can cause problems for the new user. For example, if a new user accesses this location in the virtual world, the new user will see avatars in fixed or random positions with text either displayed over each avatar's head, or all text in the world displayed in an adjacent chat window. Thus, the new user cannot easily discern which characters are speaking to each other, i.e., between which characters a conversation is taking place. This chaotic presentation may overwhelm a new user, and in some instances may cause embarrassment. For example, if several characters are having a private conversation, the new user will be unaware and may intrude by attempting to join in the conversation. This uncertainty regarding who is conversing with whom inhibits communication, and thus also inhibits the popularity of virtual worlds.

A further problem with conventional virtual world applications is that they do not reflect the sensory experience of communicating in the real world. For example, in the real world, people have private conversations even in a large group setting, and once people enter into a conversation, they tend to focus on the other party and exclude the dialogue of others. However, conventional virtual world applications typically display comments made by any user in the virtual world location to all other users currently at that location. This inhibits users from conducting private conversations in a virtual world. For example, people in a virtual world may be reluctant to discuss personal issues if they know that all users will be able to see their conversations. Finally, if a user attempts to join a conversation with other users, in contrast to a real world situation, the user is provided no social feedback clues that the user is engaging in conversation with a select group of people. Typically, there is no change in the display of the virtual world environment responsive to entering into a communication with another user. Thus, these dichotomies between the look and feel of conventional virtual world applications and the users' expectations based on their own real world experiences discourage use of conventional virtual world application. Users may find them artificial, awkward, and conversation-inhibiting forum within which to hold conversations. Therefore, a more realistic environment for users communicating within a virtual world is needed.

SUMMARY OF THE INVENTION

In accordance with the present invention, a system, method, and apparatus provide chat clusters in a virtual world setting. A chat cluster is a self-defined group of users who wish to confine their conversation to each other. In accordance with the present invention, the avatars of those users who are engaging in a private communication are displayed in chat clusters to indicate to other users that the members of chat clusters are communicating with each other. To further provide a more realistic environment, communications transmitted and received by participants in a chat cluster are only broadcast to the other participants. Additionally, a separate chat cluster point of view is provided when the user is in a chat cluster to allow the user to focus more specifically on the avatars of the other users in a chat cluster. Thus, a more realistic paradigm for a virtual world environment is provided in which avatars are displayed in more natural positions reflecting the communication activity occurring within the environment.

In accordance with the present invention, a request to initiate a chat cluster is received from a user. Next, the other participants of the chat cluster are identified. The other participants are identified by receiving a designation from either the users wishing to participate or they can be identified from a communication from a single user that identifies the other participants in the setting. Once the participants in the chat cluster are identified, a conversation area within the virtual environment is defined. The conversation area is an unseen demarcated area within which the avatars of the participants are positioned. The size, shape and location of the conversation area is generated responsive to the number of participants in the chat cluster, i.e., for two participants, the area is small, and for a cluster with many participants, the conversation area is large. Then, the avatars are oriented within the conversation to face toward each other, or toward the center of the conversation area. When the environment is displayed to the users of the virtual world, the avatars appear to be naturally displayed as groups of people having conversations with each other. Thus, new users can immediately visually identify which users are conversing with each other, and can determine which users are available for approach.

In a further embodiment, once initiating a chat cluster, the participants of the chat cluster broadcast their communications on a chat cluster communication channel. The chat cluster communication channel conducts communications from participants only to other participants of the chat cluster. This ensures that the conversations within a chat cluster remain private. Dialogue transmitted by users not part of the chat cluster are broadcast on a default communication channel, which is received' by all users in the environment. Finally, once in a chat cluster, a separate chat cluster point-of-view is provided to the chat cluster participants that displays the participants of the cluster more intimately.

BRIEF DESCRIPTION OF THE DRAWINGS

FIG. 8 is a block diagram illustrating a system for providing a virtual world to a plurality of users and for generating chat clusters.

DETAILED DESCRIPTION OF THE PREFERRED EMBODIMENTS

Figure 1A:
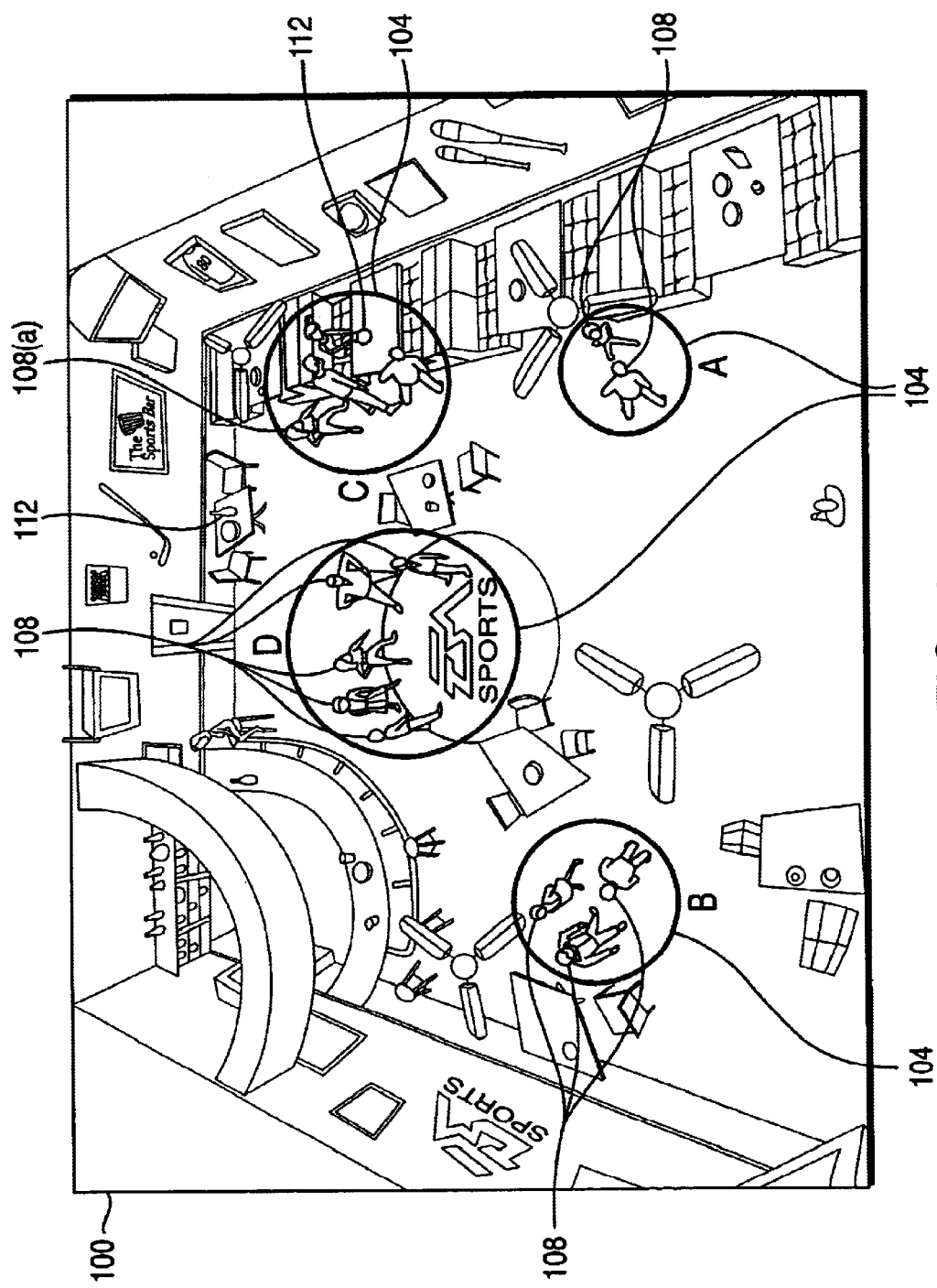
FIG. 1a is an illustration of one embodiment of an environment in a virtual world in which chat clusters are formed.

FIG. 1a illustrates a rendered view of an environment 100 in a virtual world in which users control avatars 108 to interact with avatars 108 of other users of the virtual world. As used herein, a virtual world is an artificial construct comprising of a variety of interconnected environments 100. The users of the virtual world control avatars 108 that represent the user throughout the world, moving the avatar 108 from one environment 100 to another within the world. The avatars 108 are, in the preferred embodiment, animated figures selected by the user or randomly assigned to the user to represent the user within the virtual world. As discussed in more detail in FIG. 8, in a preferred embodiment, a virtual world management module 812 resides on a server 804 to manage the activities of the virtual world. A virtual world application module 816 resides on a user's computer 800 to separate the rendering of the avatars 108 and environments 100 that make up the virtual world.

As users interact with other users, chat clusters 104 may be formed. A chat cluster 104 is a self-selected grouping of avatars 108 whose users are engaging in a cluster-wide conversation. A chat cluster 104 is associated with a conversation area that contains the avatars 108 who are members of the chat cluster 104. The avatars 108 are positioned within the conversation area to provide the appearance that they are communicating with each other in a private conversation. As shown in the exemplary embodiment of FIG. 1a, there are four chat clusters 104 in the environment 100. Chat cluster A is comprised of only two avatars 104. Both avatars 108 are facing one another, and are displayed in physical proximity to each other. Chat cluster B comprises three avatars 108, they are facing the center of the cluster, and they are also displayed in close physical proximity, although slightly farther apart than in chat cluster A. Chat cluster D comprises five avatars 104, and chat cluster C shows four other avatars 104 grouped in conversation. As shown in FIG. 1a, the environment 100 is displayed in an environment-wide perspective as it would be to a user whose avatar 108 is not part of any of these chat clusters 104.

Thus, in accordance with the present invention, a user who enters this environment 100 in the virtual world is able to readily understand the social dynamics of the environment. By simply looking at the environment 100 as displayed in FIG. 1a, the user would immediately be able to understand who is readily approachable (those not part of a chat cluster 104) and who may not want to be approached by another user because they are already engaged in conversation. In contrast, in conventional virtual environments, chat clusters are not provided, and the avatars are displayed in random or user selected positions and poses that do not reflect the actual social dynamic of a conversation in the environment. Newcomers are then left to guess at who is talking to whom, and thus the chances of an inadvertent intrusion on a private conversation are high. Thus, the present invention provides a more natural, dynamic version of a virtual world by providing and displaying chat clusters 104 within which users can communicate. In accordance with the present invention, chat clusters 104 may be generated for virtual worlds, as described above, or for single environments in which there are at least two avatars 104 present.

Figure 1B:
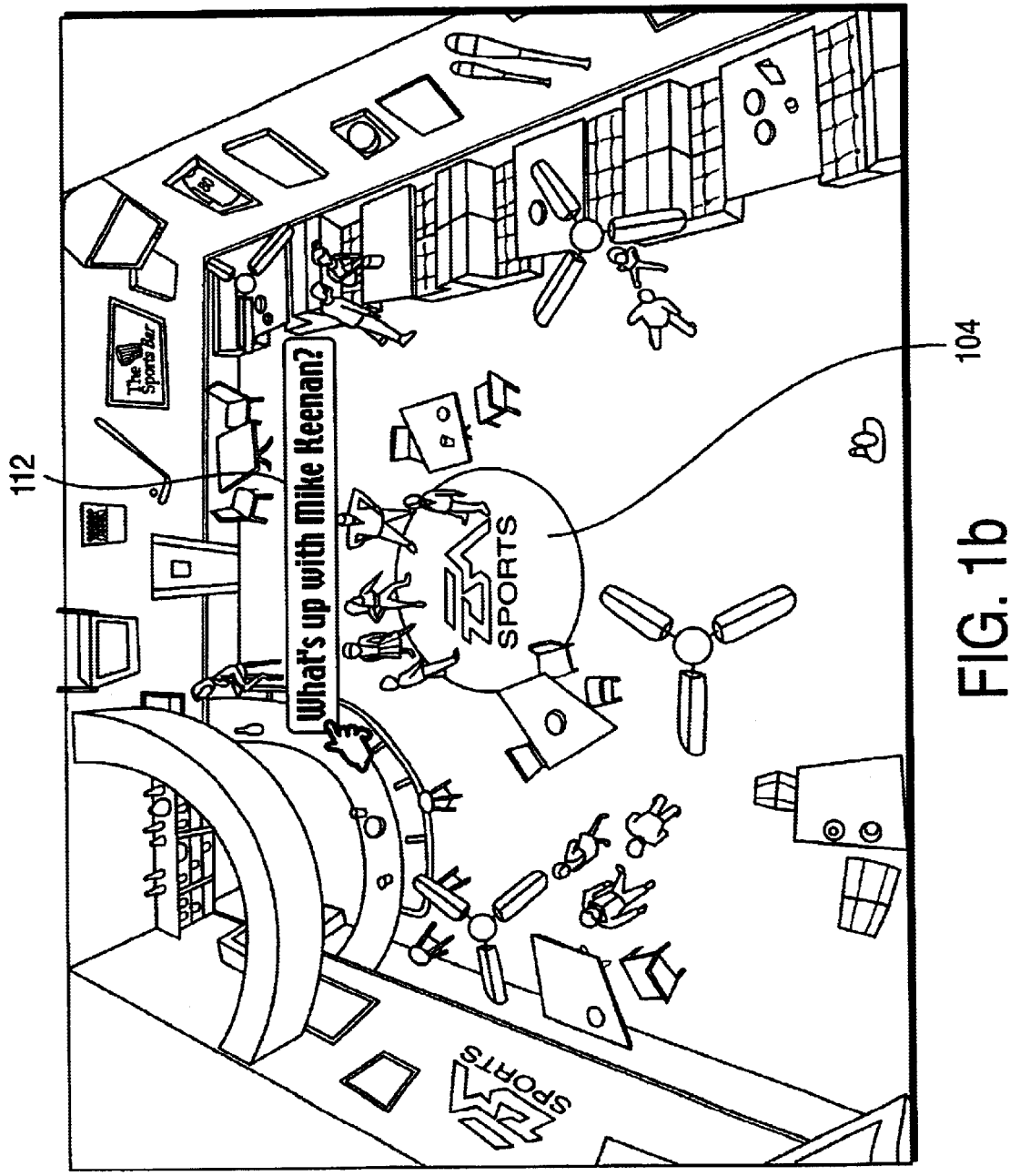
FIG. 1b is an illustration of an alternate embodiment of an environment in a virtual world in which chat clusters are formed.

FIG. 1b illustrates an alternate environment 100 in which chat clusters 104 are displayed. In this embodiment, a chat cluster caption 116 is provided over a chat cluster 104 to indicate to a new user what each cluster 104 is discussing. Thus, this allows a new user to quickly determine which cluster 104 to join. The caption 116 is generated by the virtual world management module 812 responsive to an input requested by an initiator.

Figure 2A:
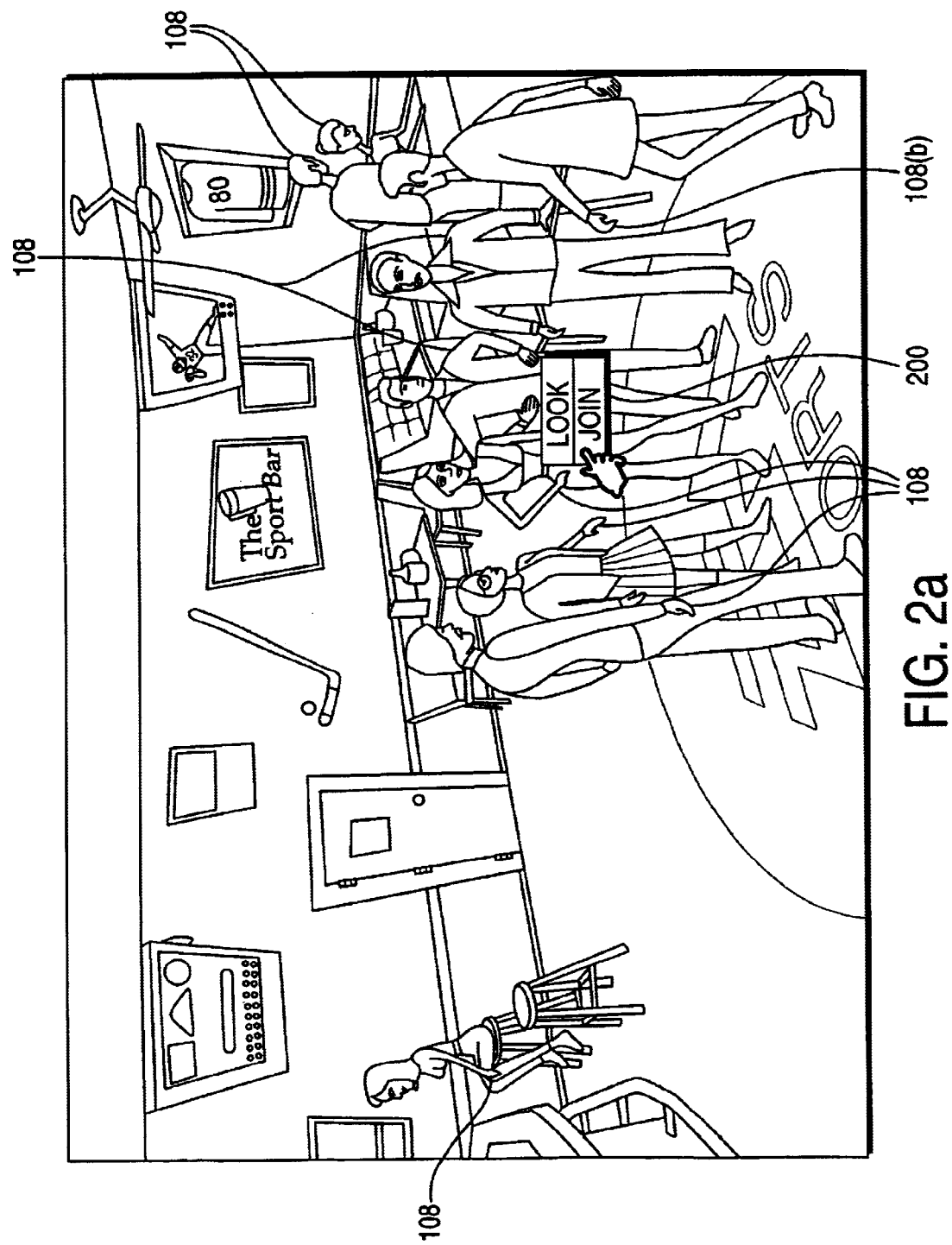
FIG. 2a is an illustration of an environment of a virtual world in which a user is displayed options for the actions a user may take with an avatar.

FIG. 2a illustrates an environment 100 in which options for joining a chat cluster 104 are displayed to a user. In FIG. 2a, avatar 108(b) is not a participant in the chat cluster 104. However, in this embodiment, a menu 200 providing the user an option to join the chat cluster 104 is displayed to the user of the avatar 108(b). The menu 200 is preferably displayed responsive to the user right-clicking on any participant of the chat cluster 104. The user is provided a "Look" option and a "Join" option in the menu 200. Selecting "Look" allows the user to view the chat of the chat cluster 104. Selecting "Join" allows the user to join the chat cluster 104.

Figure 2B:
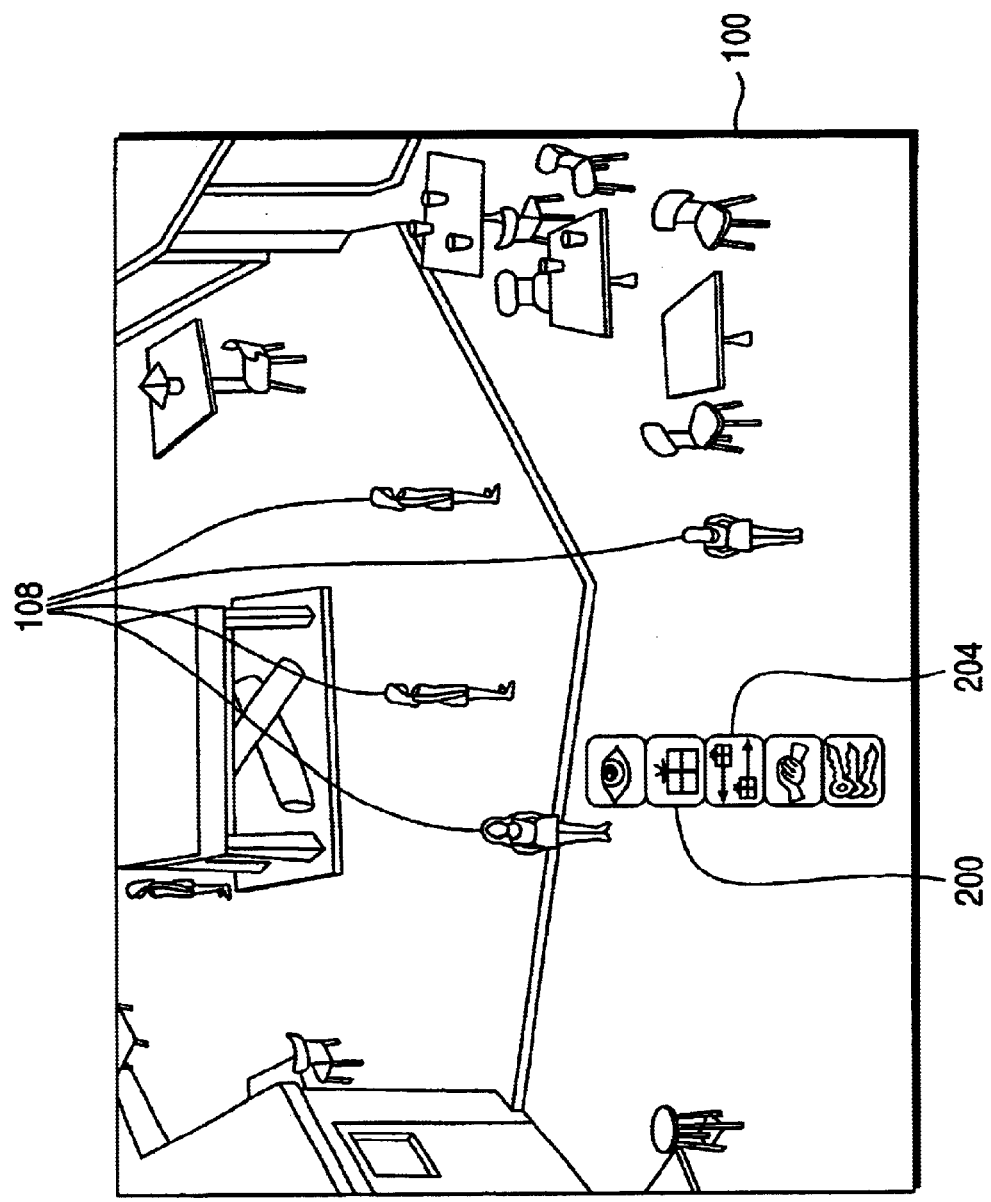
FIG. 2b is an illustration of an alternate embodiment of an environment of a virtual world in which a user is displayed options for the actions a user may take with an avatar.

FIG. 2b illustrates an alternate embodiment of an environment 100 of a virtual world in which a user is displayed options for the actions the user may take with an avatar 108. In this embodiment, a pop-up menu 200 is displayed to a user after a selecting the user's avatar 108, for example, by positioning a mouse cursor over the avatar 108 and then clicking the context button of the mouse. The pop-up menu 200 displays different actions the user can take with the avatar 108. In accordance with the present invention, one of the icons in the menu 208 is a chat cluster action icon 204. Selecting the chat cluster action icon 204 provides the user with the options of joining in an existing chat cluster 104 or initiating a new chat cluster 104. If the avatar 108 is already in a chat cluster 104, an exit chat cluster option is displayed. In an alternate embodiment, a separate icon is displayed in the menu 200 providing the separate option of joining in an existing chat cluster 104. Of course, the enter chat cluster option may be selected by the user in various other ways, for example, through selection of an icon on a toolbar, or through selection of predefined keyboard buttons, or macros, or the like.

Figure 3:
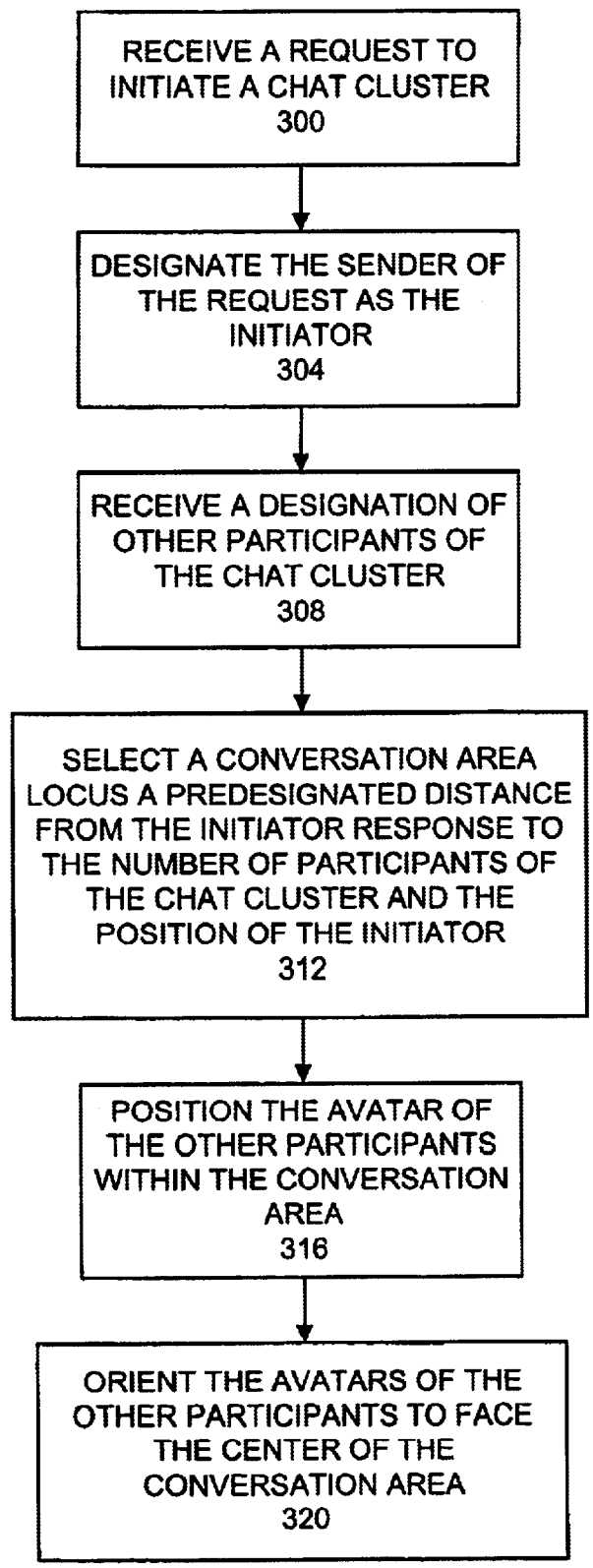
FIG. 3 is a flowchart illustrating the processing of a request to initiate a chat cluster.

If the user has selected an initiate chat cluster 104 option, in the preferred embodiment the methodology as shown in FIG. 3 is executed. First, a request to initiate a chat cluster 104 is received 300. In a preferred embodiment, the request is generated at the computer 800 by the user and the virtual world application module 816 transmits the request to the virtual world management module 812. As described above, a user may send a request by selecting the chat cluster action icon 204 of a displayed action pop-up menu 200. Then, the sender of the request is designated 304 by the virtual world management module 812 as the chat cluster 104 initiator. The chat cluster 104 initiator is an arbitrary designation of one of the participants in a chat cluster 104 to build the conversation area. Thus, the initial requester is selected as the initiator, but any of the participants could be so designated in accordance with the present invention.

Then, the virtual world management module 812 receives 308 a designation of other participants in the chat cluster 104. In a preferred embodiment, once a user selects an initiate chat cluster action, a dialog box is displayed on the user's computer 800 that allows the user to enter identifications of the other avatars 108 who will participate in the chat cluster 104. The identifications can be the user name or other identifier of an avatar 108. Alternatively, after selecting an initiate chat cluster 104 request option, the initiator may select other avatars 108 to join the chat cluster 104 by pointing and clicking on the avatars 108 with a mouse. Responsive to a selection, a confirmation message is transmitted and displayed on the computer 800 of the users of the selected avatars 108 to confirm that the users want to participate in the chat cluster 104. There is no logical limit on the number of avatars 108 that can be placed in a chat cluster 104.

Figure 4A:
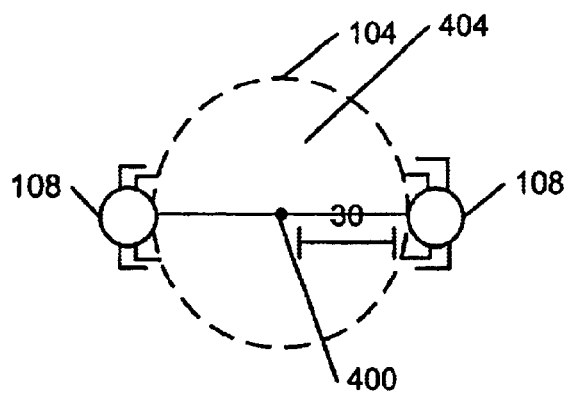
FIGS. 4a, 4b, and 4c are illustrations of the formation of conversation areas.

Next, a conversation area locus is selected 312 by the virtual world management module 812. In a preferred embodiment, the locus is a predesignated distance from the initiator, and is selected responsive to the number of participants of the chat cluster 104 and the position of the initiator in the virtual world. For example, FIG. 4a illustrates a conversation area 404, with two avatars 108, and a conversation area locus 400. The locus 400 is placed at a distance from the initiator chosen to allow the number of participants to be positioned in the area 404 at a distance that appears to show conversational grouping without being excessively intimate. Additionally, the locus 400 is placed in a position in the environment 100 so that the resulting conversation area 404 that surrounds the locus is able to contain the avatars 108 of the other participants of the chat cluster 104. For example, if the initiator's avatar 108 is positioned in the upper left corner of a virtual room, the locus 400 is placed toward the center of the room and not, for example, against a wall. If, as in FIG. 1a or FIG. 1b, there are objects 112 in the environment 100, such as tables, then the locus 400 is placed in a direction away from a potentially interfering object 112. However, as shown in FIG. 1a, in chat cluster C, the locus 400 of the conversation area 404 can be placed on an object 112 as long as the avatar 108 can be placed around the object 112, i.e., as long as the edge of the conversation area 404 is beyond the edge of the object 112.

Then, the other avatars 108 are positioned 316 within the conversation area 404 defined by the selected locus 400. Conversation areas are preferably created in the form of a circle; however, any geometric shape, such as triangles, other polygons, or semicircles, can be used as a conversation area. Additionally, non-geometric shapes such as a line-up of avatars facing the user's avatar can also be used in accordance with the present invention. Referring again to FIG. 4a, if there are only two participants in a chat cluster 104, the avatar 108 of the second participant is placed equidistant from the locus 400. For example, if the locus 400 is chosen to be thirty virtual world units from the initiator, the avatar 108 of the second participant is also placed thirty virtual world units from the locus 400. A virtual world unit is an arbitrary but uniform measure of distance in a virtual world.

Figure 4B:
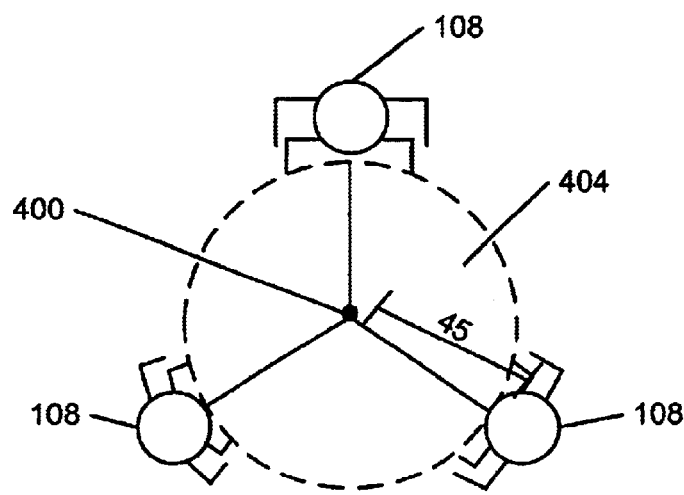
Figure 4C:
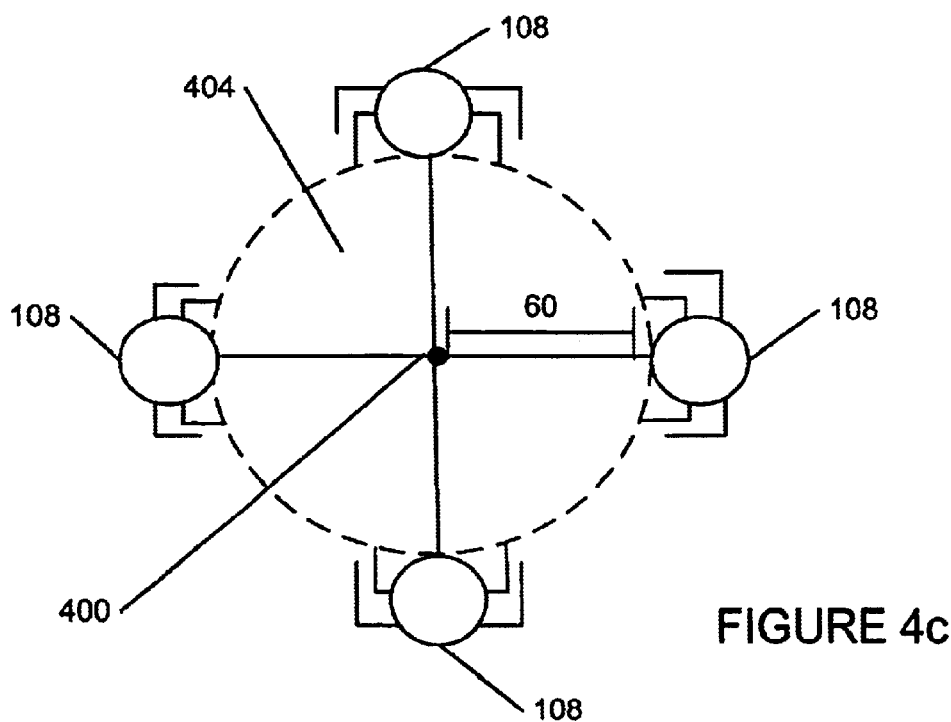

If there are more than two participants in a chat cluster 104, the position locus 400 of the conversation area 404 is adjusted responsively to maintain approximately equal spacing among the avatars 108, and provide sufficient area within which the avatars 108 can be positioned. For example, if there is a third participant in the chat cluster 104, fifteen units are added to the distance between the initiator and the locus 400 of the conversation area 404, providing a distance of forty-five virtual world units between the initiator and the locus of the conversation area, as shown in FIG. 4b. If there are to be four people in the chat cluster, as shown in FIG. 4c, an additional thirty units (for a total of sixty units) is added to the distance between the locus of the conversation area and the initiator. Thus, in the preferred embodiment, the equation 15×X=distance of locus 400 to the initiator is used to determine the location of the locus 400, where X is the number of participants in the chat cluster 104. This equation preferably dynamically adjusts the amount of area within a conversation area 404 to fit the number of participants in the chat cluster 104. Of course, the numerical value 15 is an arbitrary designation of units, any value that represents sufficient spacing to provide a natural-looking grouping could be used. Other relationships for adjusting the area of a conversation area 404 responsive to a number of participants are considered to be within the scope of the present invention.

In a preferred embodiment, the avatars 108 are positioned on the edge of the conversation area 404, equally spaced apart. As shown in FIGS. 4a, 4b, and 4c, in a preferred embodiment the conversation area 404 is configured as circle, with the locus 400 as the circle's center, and the distance between the initiator and the center of the circle being the radius of the circle 400. Using a circle allows for simple calculations in determining how to evenly space the avatars 108 of the participants of the chat cluster 104. Thus, in a preferred embodiment, each avatar is positioned 360/X degrees apart on the circumference of the circle, where X is again the number of participants in the chat cluster 104. Thus, in FIG. 4b, the avatars are 120° apart on the circumference of the circle. In FIG. 4c, the avatars are 90° apart. Other shapes of conversation areas 404 could also be used, for example, polygons could be used, where a new side is added for each participant, and the avatars 108 are placed in the midpoint of each side. Alternatively, a chat cluster may be formed as a "line-up," as described above, in which the user's avatar is facing the other avatars who are arranged in a line, and the length of the line is extended for each new participant, and the distance between the user's avatar and the line-up is extended responsive to the addition of new participants. A similar expansion method can be used in an embodiment in which the user's avatar is facing a semicircle of other participants.

Finally, the avatars 108 are oriented 320 to face the locus of the conversation area 404. As shown in FIG. 4a, orienting the avatars 108 in this manner allows the avatars 108 to face one another when there are only two avatars 108, and when there are more than two, the avatars 108 are facing toward the center of the group. This provides the appearance to a user not part of the chat cluster 104 that the avatars 108 within a chat cluster 104 are connected or are in a group. In an alternate embodiment, the avatars 108 are oriented to face the avatar 108 that has most recently transmitted dialogue. In an embodiment in which the avatar's head is separately controlled, only the head tracks the last speaker, and the body movement is adjusted minimally.

In a preferred embodiment, the initiator can set restrictions on how others can join a newly created chat cluster 104. In this embodiment, upon creating a chat cluster 104, the virtual world application module 816 prompts the initiator to select an access type for the chat cluster 104 to be formed. For example, in one embodiment, the initiator selects between private, public, "ask permission", and "ask me only" access types. A private chat cluster 104 does not allow any other users to join the chat cluster 104 once created. A public chat cluster 104 allows anyone else to join by simply selecting the "join group" icon on the pop-up menu 200. The "ask permission" option allows a user to select any participant in the chat cluster 104 from which to request permission to join, and the selected participant is then transmitted a message by the virtual world management module 812 asking whether access should be granted or denied. The "ask me only" option allows a user to request permission to join from the initiator only.

Figure 5:
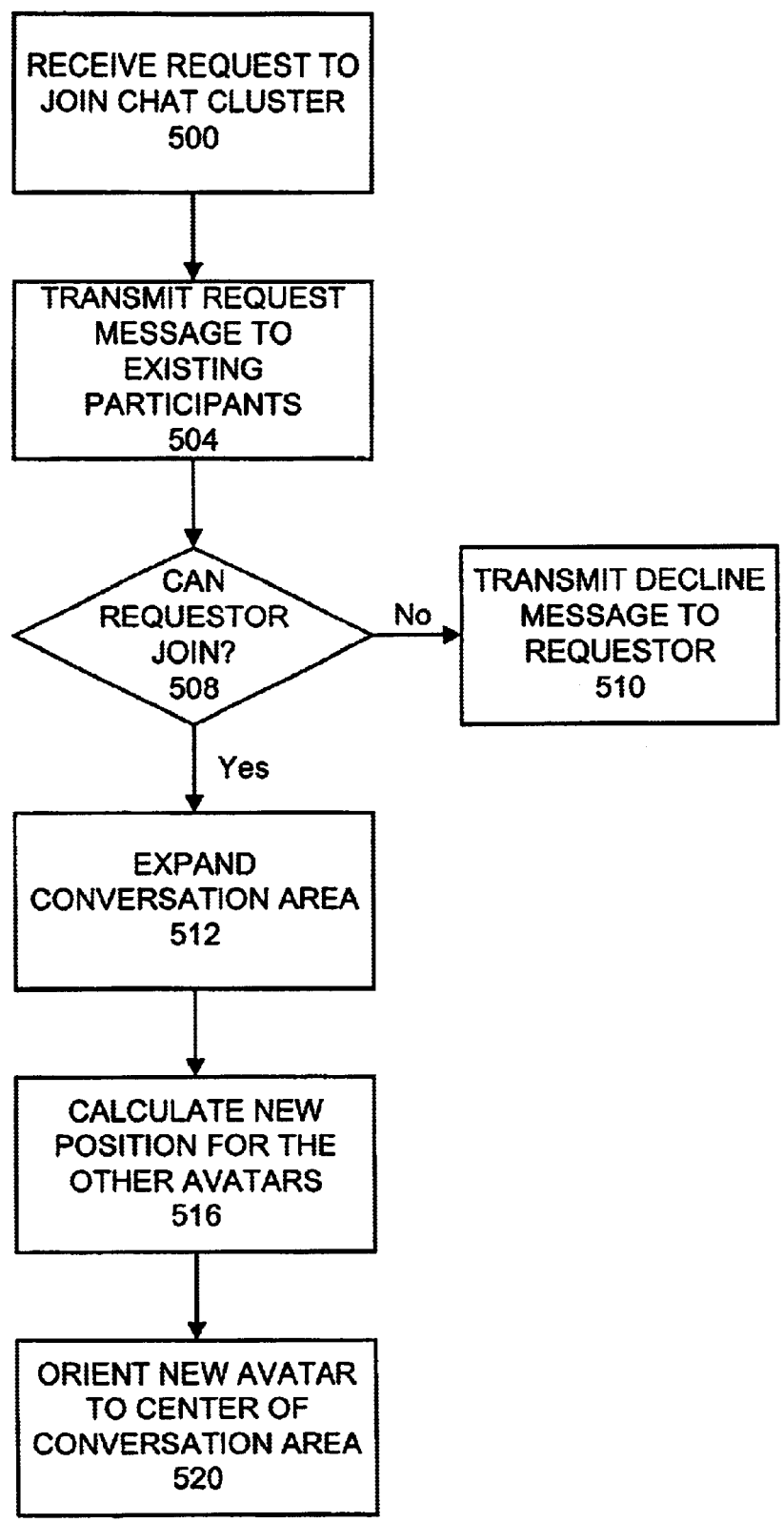
FIG. 5 is a flowchart illustrating the processing of a request to join an existing chat cluster.

FIG. 5 illustrates one embodiment of the processing of joining an existing chat cluster 104. First, a request is received 500 by the virtual world management module 812, to join an existing chat cluster 104. Again, this request is transmitted in a preferred embodiment via selection of a chat cluster action icon 204 and then selection of the join existing chat cluster sub-option. Then, a message is transmitted 504 by the management module 812 to the application modules 816 of the existing participants of the chat cluster 104 asking whether the requester can join the chat cluster 104. Then, the responses are evaluated to determine 508 whether the requester can join. In one embodiment, a unanimous affirmative response is required to allow a new user to join. This ensures that users control with whom they communicate. In an alternate embodiment, a simple majority vote is required to allow a new user to join. Other methods of determining whether a new participant of a chat cluster 104 is permitted to join can also be used in accordance with the present invention.

Responsive to the user being allowed to join, the conversation area is expanded 512 as described above, in accordance with the equation 2*X=distance from initiator to locus 400, where X is the new number of participants. Alternatively, the predesignated unit is simply added to the existing distance to determine the new distance. In the above example the predesignated unit is 15, and thus when a new member joins, the distance from the locus 400 to the avatars 108 of the participants is increased by 15 units. Then, new locations in the conversation area are calculated 516 for the avatars 108 of the other participants. For example, if there are currently four avatars 108 in a conversation area 404 that is a circle with a diameter of 60 units, the four avatars 108 are spaced 90° apart. Upon adding a fifth participant, all avatars 108 are moved to locations 72° apart on a circle 75 units in diameter. Then, the new avatar 108 is oriented 520 to face the locus 400 of the conversation area. For conversation areas that are not circles or polygons, the spacing between avatars is similarly enlarged responsive to adding a new participant.

In one embodiment, initiating a chat cluster 104 is executed in the same manner as joining a chat cluster 104. In this embodiment, an initial chat cluster is formed but not displayed in accordance with the methodology of FIG. 3, and the additional participants above two are added to the chat cluster repetitively as described in FIG. 5. This embodiment minimizes the processing required in forming a chat cluster 104.

In one embodiment, the presence of objects 112 are accounted for in the positioning of avatars 108 in a chat cluster 104. As shown in FIG. 1a, chat cluster C is not a true circle because of an object 104 (in this example, a table) prevents avatar 108(a) from being placed in its designated position on the circumference of the circle. However, in accordance with the present invention, this problem is addressed by placing the avatar 108 in a position as close as possible to the calculated location for that avatar 108, while not interfering with object 112.

Figure 6A:
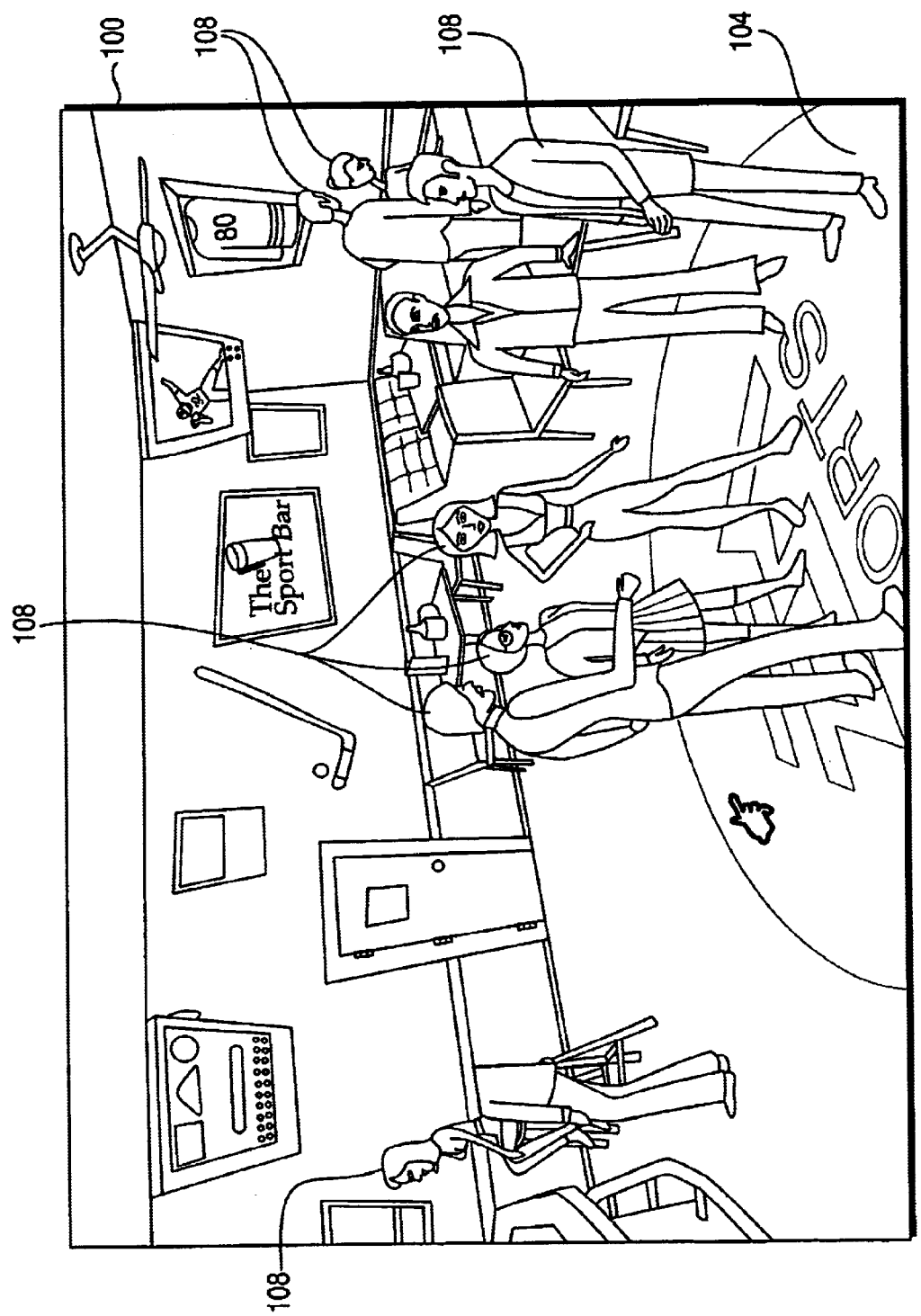
FIG. 6a is an illustration of a preferred embodiment of the environment of FIG. 1a after a user,has entered a chat cluster.
Figure 6B:
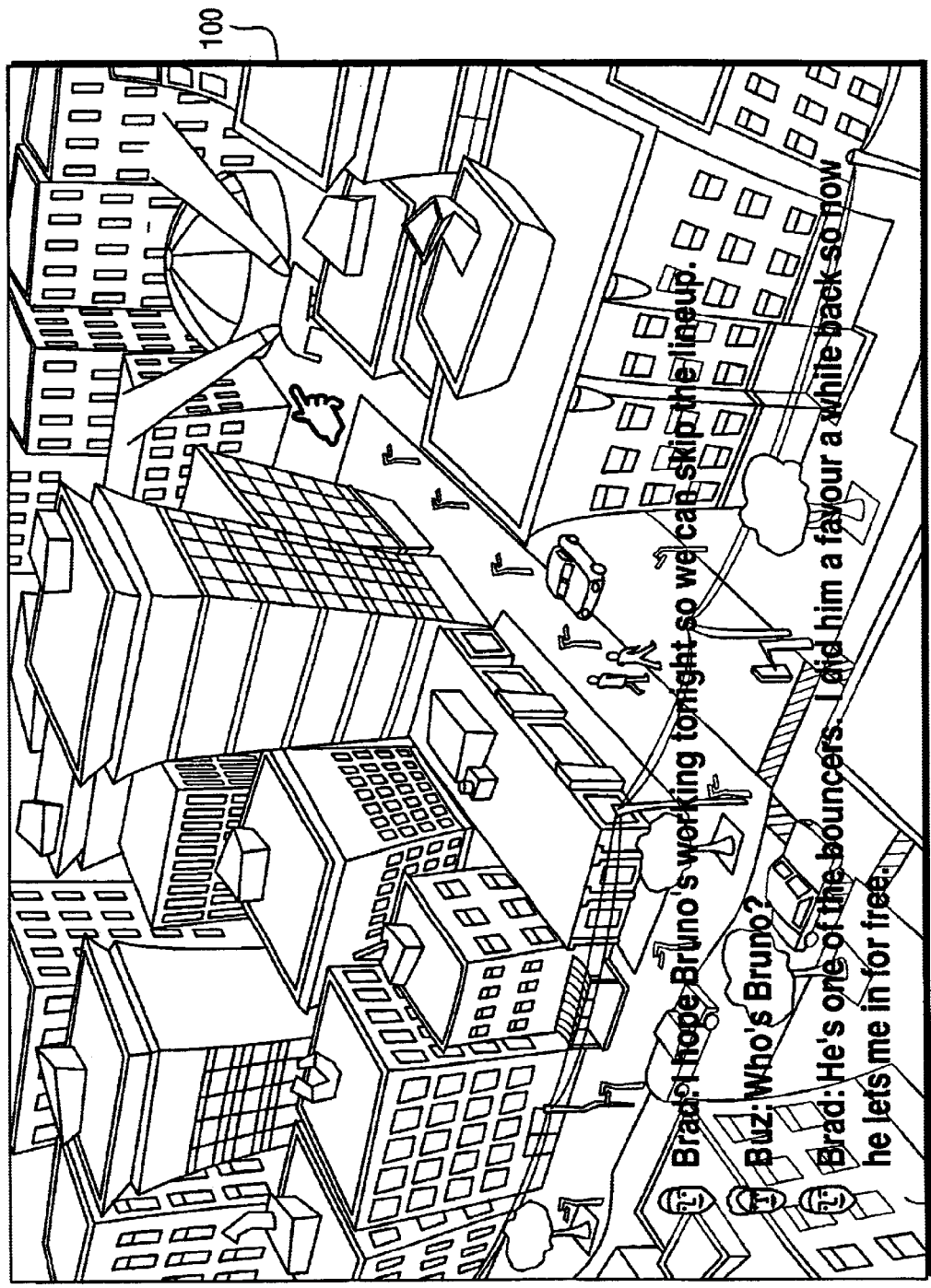
FIG. 6b is an, illustration of an environment-wide default communication channel.
Figure 6C:
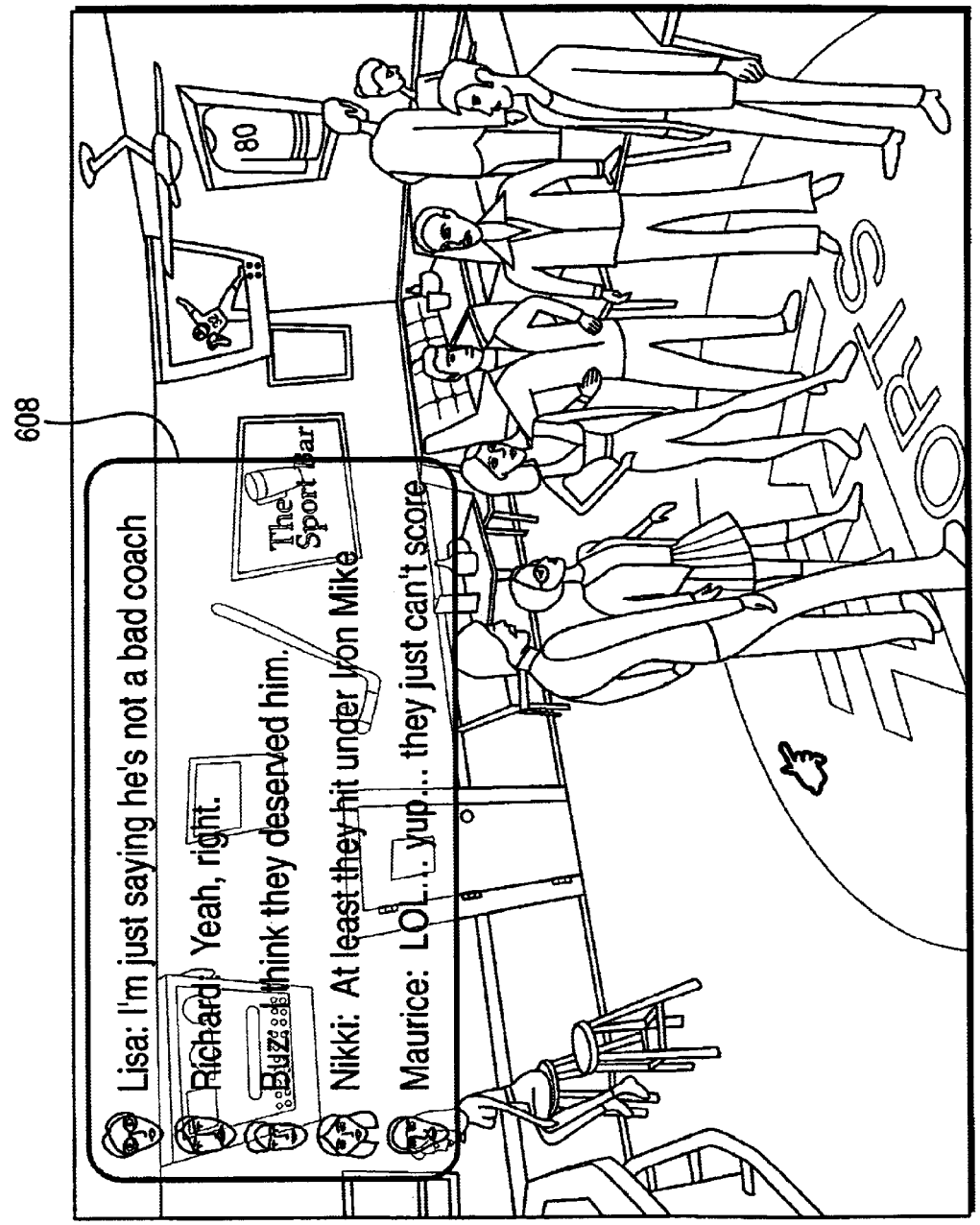
FIG. 6c is an illustration of a preferred embodiment of an environment displaying a chat cluster communication channel.

In accordance with the present invention, additional features provide an even more realistic conversational environment. Upon entering a chat cluster 104, the point of view of the user is shifted, as illustrated in FIG. 6a and FIG. 6c when the user enters a chat cluster 104. Thus, in FIG. 1a and FIG. 1b, an environment-wide perspective is furnished to the user to allow the user to view all of the avatars 108 within an environment 100. This is similar to a real world party where a guest looks over a crowd upon entering a room to see who is in the room. Then, once entering a chat cluster 104, the present invention provides a more intimate view of those avatars 108 in the chat cluster 104, and excludes some avatars 108 in the environment 100 who are not part of the chat cluster 104 to minimize the display of information. The close-up view is generated through conventional rendering technique to display a larger version of each avatar 108 in the chat cluster 104. Larger and more detailed versions of each avatar 108 are preferably maintained on the server 812, and the virtual world management module 812 uses these avatars 108 to create the close-up angle.

In an alternate embodiment, the perspective is chosen in accordance with the present invention as an angle closest to the user's avatar 108 in the conversation area 400. Thus, in FIG. 6a, the avatar 108 whose side is turned toward the "camera" is the user's avatar, and thus the other avatars 108 are seen facing the "camera" of the user's display. For each user in the chat cluster 104, their camera angle is positioned such that their avatar 108 is seen in profile, and the other avatars 108 are seen facing their display. Again, this provides the feeling to the user that the user is actually talking to the other avatars 108. "Aural" selectivity is also provided for in accordance with the present invention. When not in a chat cluster 104, as in FIG. 6b, the user 100 is linked to an environment-wide default communication channel 604, in which dialogue transmitted by all those in the environment 100 who are not part of chat clusters 104 is broadcast and is viewed by the user. Thus, dialogue on this channel 604 is open dialogue, and is intended to be heard by all. However, if a user joins chat cluster 104 as shown in FIG. 6c, the user is linked to a chat cluster communication channel 608 for that specific chat cluster 104. Each chat cluster communication channel 608 broadcasts only dialogue generated by the participants of the chat cluster 104. This allows for groups in a virtual world to selectively engage in private conversations, without fear of being "overheard." Additionally the chat cluster communication channel 608, by displaying only chat cluster participant conversation to each other, provides a more intimate feeling to a group. In one embodiment, the users in a chat cluster 104 only receive transmissions from the chat cluster channel 608, and are prohibited from receiving transmission from the environment wide channel 604. This also provides a more private feeling to the users in a chat cluster 104.

Figure 7:
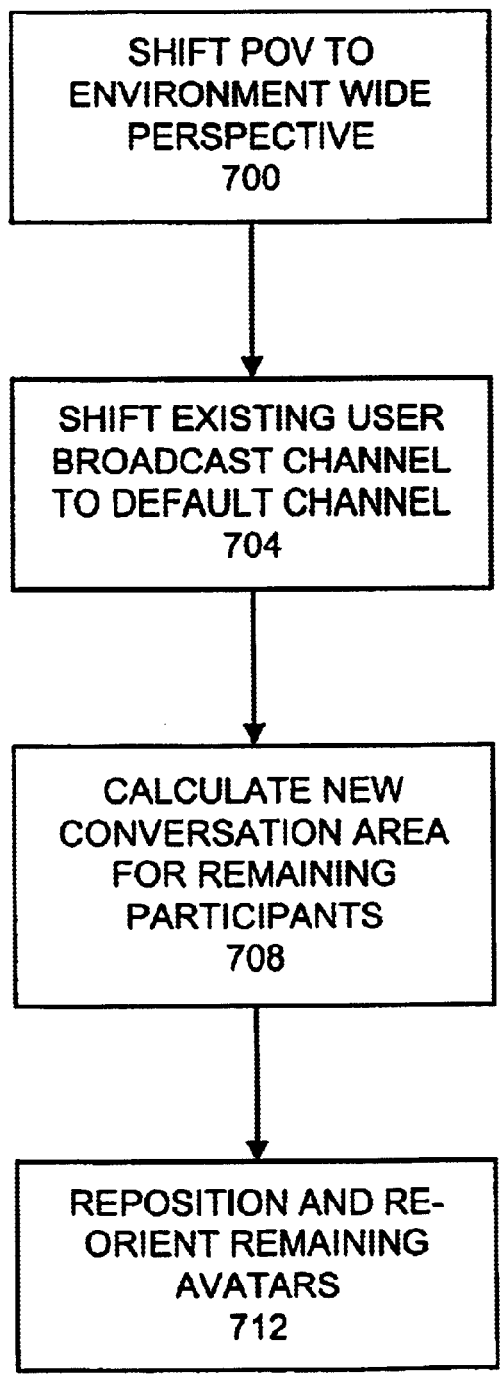
FIG. 7 is a flowchart illustrating the processing of a request to exit an existing chat cluster.

FIG. 7 illustrates a method for exiting a chat cluster in accordance with the present invention. In a preferred embodiment, this is accomplished by the user moving the avatar 108 to a different location in the environment 100. Once this occurs, the point of view (POV) of the user shifts 700 back to the environment-wide perspective (e.g. like FIG. 1a), the user can now receive 704 dialogue broadcast by those not in chat clusters 104, and the user can no longer receive 708 dialogue transmitted by those still in the chat cluster 104. Once the user leaves a chat cluster, a new conversation area 404 is calculated 712 for the remaining participants in the chat cluster 104, and that area 404 is re-rendered for all users.

FIG. 8 is a block diagram illustrating a system for providing a virtual world to a plurality of users and for generating chat clusters. A plurality of computers 800 are connected through a network 808 to a server 804. The computers 800 are typically any personal computer or similar other computing device as is known in art having a display device useful for viewing graphical data.

If a user wants to engage in the virtual world, the user launches a virtual world application module 816 resident on the user's computer 800, which provides a connective interface to the virtual world management module 812 resident on the server 804. Typically, connecting to a server 812 involves opening and maintaining a persistent TCP/IP connection between the user's computer 108 and the server 804. In one embodiment, the virtual world application module 816 renders and displays the graphics of the virtual world responsive to the information received from the server 804.

The virtual world management module 812 generates the information regarding the objects 112 and avatars 108 in an environment 100, and coordinates the interconnection between environments 100 in the virtual world. Additionally, the virtual world management module 812 manages the generation of, expansion, reduction, and maintenance of chat clusters 104 in the virtual world. Thus, in the preferred embodiment, the user enters a request to join a chat cluster 104 in the user's virtual world application module 816, and the request is transmitted and processed by the virtual world management module 812 on the server 812. Providing the processing on the server minimizes the processing required by the user's computer 800, allowing less powerful computers 800 to be used by the users. In an alternate embodiment, the virtual world application modules 816 resident on each user's computer 100 performs the processing individually, and the server 812 acts merely as a conduit of information. Thus, the methodologies described above may be performed by individual computers 800, a server 812, or a combination of both. Additionally, the methodologies described above may be implemented in hardware or software modules, as is known to those of ordinary skill in the art. Also as known to one of ordinary skill in the art, the networking portion of this description is only one of a myriad of possible configuration allowing users to communicate through computing devices. For example, users may be linked over a local-area-network or they may have a direct connection established between their computers. All of these alternate communication configurations are considered to be within the scope of the present invention.

What is claimed is:

1. A method for organizing avatars representing users for display in a virtual environment in which at least one user requests a chat cluster of at least two participating users to be formed, the method comprising:

automatically generating a conversation area within the virtual environment having a size responsive to a number of users participating in the requested chat cluster;

automatically re-positioning avatars representing the users participating in the requested chat cluster such that the re-positioned avatars are positioned within the conversation area; and automatically re-orienting the avatars such that the avatars in the chat cluster are facing toward a common location, wherein the common location is within the conversation area.

2. The method of claim 1 further comprising:

designating a user participating in the chat cluster as an initiator; and selecting a locus of the conversation area responsive to a number of participants in the chat cluster and the location of at least one avatar.

3. The method of claim 1 further comprising:

designating a user participating in the chat cluster as an initiator; and selecting a locus of the conversation area responsive to a predefined value representing a distance from a location of the initiator and the locus of the conversation area and responsive to the location of the initiator.

4. The method of claim 3 wherein re-positioning comprises:

re-positioning the avatar of the initiator at a first position near an edge of the conversation area; and responsive to determining that there are two total participants in the chat cluster, re-positioning the avatar of the second participant of the chat cluster near the edge of the conversation area at a second position directly opposite the first position of the avatar of the initiator.

5. The method of claim 3 wherein re-positioning comprises:

re-positioning the avatar of the initiator near an edge of the conversation area; and re-positioning avatars of the other participants of the chat cluster in locations near the edge of the conversation area such that the re-positioned avatars are spaced substantially equidistantly apart.

6. The method of claim 1 wherein generating a conversation area comprises:

automatically generating a circle whose radius is equal to a predesignated value multiplied by the number of users in the chat cluster.

7. The method of claim 1 wherein re-orienting further comprises:

re-orienting the avatars to face a locus of the conversation area.

8. The method of claim 1 further comprising:

designating a user participating in the chat cluster as an initiator; and generating a circle responsive to a location of the initiator in the virtual environment whose diameter is equal to a predesignated circle diameter value; and wherein re-positioning comprises:

positioning an avatar of the initiator on a circumference of the circle; and re-positioning an avatar of a second participant of the chat cluster on the circumference of the circle at a point directly opposite the position of the initiator.

9. The method of claim 8 further comprising:

determining whether there is a third participant in the chat cluster; and responsive to there being a third participant in the chat cluster, adding a circle expansion value to the circle diameter value; and re-positioning the avatars of the initiator and the second participant and an avatar of the third participant in positions on the circumference of the circle such that the re-positioned avatars are spaced substantially equidistantly apart.

10. The method of claim 9 wherein re-positioning the avatars of the initiator and the second participant and an avatar of the third participant further comprises:

placing the avatar of the second participant on the circumference of the circle in a position approximately 120° away from the avatar of the initiator; and placing the avatar of the third participant on the circumference of the circle in a position approximately 120° away from the avatar of the initiator and the avatar of the second participant.

11. A method for organizing avatars for display during a communication session, the method comprising:

receiving a request to join an existing chat cluster from at least one user;

automatically adjusting a size of an existing conversation area associated with the chat cluster responsive to a number of participants requesting to join the chat cluster and a number of participants currently within the chat cluster;

automatically re-positioning the avatar of the requesting at least one user such that the re-positioned avatar is positioned within the adjusted conversation area; and automatically re-orienting the avatars within the conversation area such that the avatars in the chat cluster are facing toward each other.

12. A method for organizing avatars representing users for display in a virtual environment comprising:

identifying avatars to be placed in a chat cluster;

automatically re-positioning the identified avatars so that the identified avatars are located within a conversation area; and automatically re-orienting the avatars such that the avatars face a center of the conversation area.

13. The method of claim 12 wherein identifying comprises:

receiving a communication from a user requesting to be placed in a chat cluster.

14. The method of claim 12 wherein re-positioning the identified avatars comprises:

generating a circular conversation area, having a center located near at least one of the avatars;

calculating a diameter of the circular conversation area responsive to the number of identified avatars; and placing the identified avatars in positions near the circumference of the circular conversation area.

15. The method of claim 14, wherein calculating a diameter further comprises:

adding predesignated values for each identified avatar to a default diameter value.

16. The method of claim 15 further comprising:

determining whether objects in the virtual environment interfere with the placement of an avatar; and responsive to an object within the virtual environment interfering with the placement of an avatar, placing the avatar in a position near the interfering object.

17. A method for adjusting display viewpoints of a user viewing a virtual environment containing an avatar representing the user and avatars representing other users comprising:

providing a wide angle viewpoint to the user of the visual environment;

receiving a request from the user to join a chat cluster;

automatically re-positioning the avatar representing the user in a chat cluster with avatars of other users; and providing a close up angle viewpoint to the user of the other avatars in the chat cluster.

18. A method for adjusting communication channels of a user in a virtual environment containing an avatar representing the user and avatars representing other users, the method comprising:

providing a virtual environment wide communication channel to the user to allow the user to receive and transmit communications to and from any other user in the virtual environment;

receiving a request from the user to join a chat cluster in the virtual environment;

automatically re-positioning avatars representing the users participating in the chat cluster such that the re-positioned avatars are positioned within a conversation area in the virtual environment, said conversation area having a size responsive to the number of users participating in the requested chat cluster; and providing a chat cluster communication channel in which communications transmitted from the user are transmitted only to other users that are participating in the chat cluster.

19. The method of claim 18 wherein the chat cluster communication channel permits reception of communication only from other users that are participating in the chat cluster.

20. The method of claim 18 wherein the chat cluster communication channel prohibits the reception of communication from users that are not participating in the chat cluster.

21. The method of claim 18 wherein the virtual environment wide channel does not permit transmission of communications from users that are participating in a chat cluster in the virtual environment.

22. The method of claim 18 wherein the virtual environment wide channel permits only requests to join a chat cluster communications to users already part of a chat cluster.

23. A computer readable medium for providing chat clusters in a virtual environment in which at least one user requests a chat cluster of at least two participating users to be formed, the computer readable medium comprising instructions causing a processor to automatically:

generate a conversation area within the virtual environment having a size responsive to a number of users participating in the requested chat cluster;

re-position avatars representing the users participating in the requested chat cluster such that the re-positioned avatars are positioned within the conversation area; and re-orient the avatars such that the avatars in the chat cluster are facing toward each other within the conversation area.

24. The method of claim 18, further comprising automatically re-orienting the avatars in the chat cluster such that the avatars in the chat cluster are facing toward a common location in the conversation area.

25. A computer-implemented method of organizing avatars representing users for display in a virtual environment, the method comprising:

receiving a request from at least one user requesting that a chat cluster of at least two participating users be formed;

automatically generating a conversation area within the virtual environment having a size responsive to a number of users participating in the requested chat cluster; and causing the avatars representing the users participating in the requested chat cluster to be displayed in a virtual environment such that the avatars are positioned within the conversation area, and such that the avatars in the chat cluster are facing toward a common location, wherein the common location is within the conversation area.

26. The method of claim 25, wherein the method is implemented in a server, and wherein causing includes sending instructions to a user computer to display the avatars in the virtual environment on a display screen.

* * * * *